US012626515B2

(12) United States Patent
Roedler et al.

(10) Patent No.: US 12,626,515 B2
(45) Date of Patent: May 12, 2026

(54) METHOD AND SYSTEM FOR ANNOTATING SENSOR DATA

(71) Applicant: dSPACE GmbH, Paderborn (DE)

(72) Inventors: Daniel Roedler, Karlsruhe (DE);
Phillip Thomas, Karlsruhe (DE);
Simon Romanski, Karlsruhe (DE);
Georgi Urumov, Berlin (DE); Tobias Biester, Karlsruhe (DE); Ruben Jacob,
Karlsruhe (DE); Boris Neubert,
Karlsruhe (DE)

(73) Assignee: dSPACE GmbH, Paderborn (DE)

( * ) Notice: Subject to any disclaimer, the term of this patent is extended or adjusted under 35 U.S.C. 154(b) by 361 days.

(21) Appl. No.: 18/129,382

(22) Filed: Mar. 31, 2023

(65) Prior Publication Data

US 2023/0237810 A1 Jul. 27, 2023

Related U.S. Application Data

(63) Continuation of application No. PCT/EP2021/081845, filed on Nov. 16, 2021.

(30) Foreign Application Priority Data

Nov. 17, 2020 (DE) ..................... 10 2020 130 335.1

(51) Int. Cl.
*G06V 20/58* (2022.01)
*G01S 17/931* (2020.01)
*G06V 10/82* (2022.01)
(52) U.S. Cl.
CPC ............ *G06V 20/58* (2022.01); *G01S 17/931* (2020.01); *G06V 10/82* (2022.01)

(58) Field of Classification Search
None
See application file for complete search history.

(56) References Cited

U.S. PATENT DOCUMENTS

2018/0364717 A1 12/2018 Douillard et al.
2019/0050693 A1* 2/2019 Taghavi .............. G06V 40/173
(Continued)

FOREIGN PATENT DOCUMENTS

CN 111666137 A 9/2020
JP 2020524330 A 8/2020
(Continued)

OTHER PUBLICATIONS

K He, G. Gkiozari, P. Dollar, R. Girshick, "Mask R-CNN" in arxiv. https://doi.org/10.48550/arXiv.1703.06870. (Year: 2018).*
(Continued)

*Primary Examiner* — S J Park
*Assistant Examiner* — Caroline E. Depalma
(74) *Attorney, Agent, or Firm* — Muncy, Geissler, Olds & Lowe, P.C.

(57) ABSTRACT

A computer-implemented method for annotating driving scenario sensor data, including the steps of receiving raw sensor data, the raw sensor data comprising a plurality of successive LIDAR point clouds and/or a plurality of successive camera images, recognizing objects in each image of the camera data and/or each point cloud using one or more neural networks, correlating objects within successive images and/or point clouds, removing false positive results on the basis of plausibility criteria, and exporting the annotated sensor data of the driving scenario.

13 Claims, 5 Drawing Sheets

S1: Recognize objects

S2: Discard duplicates

S3: Correlate objects temporally

S4: Remove false positive results

S5: Optimize object size by regression

S6: Close gaps

S7: Harmonize object size

S8: Smooth trajectory based on physical model

S9: Determine attributes

End

(56) References Cited

U.S. PATENT DOCUMENTS

| 2020/0018852 A1 | 1/2020 | Walls et al. |
| 2020/0218979 A1 | 7/2020 | Kwon et al. |
| 2020/0250399 A1 | 8/2020 | Matsumaru et al. |
| 2020/0380274 A1* | 12/2020 | Shin ......................... G06T 1/20 |

FOREIGN PATENT DOCUMENTS

| KR | 20200087354 A | 7/2020 |
| WO | WO 2018180285 A1 | 10/2018 |

OTHER PUBLICATIONS

D. Wang, X. Chen, H. Yi and F. Zhao, "Improvement of Non-Maximum Suppression in RGB-D Object Detection," in IEEE Access, vol. 7, pp. 144134-144143, 2019, doi: 10.1109/ACCESS.2019.2945834. (Year: 2019).*

M. A. Reza, K. Chen, A. Naik, D. J. Crandall and S.-H. Jung, "Automatic Dense Annotation for Monocular 3D Scene Understanding," in IEEE Access, vol. 8, pp. 68852-68865, 2020, doi: 10.1109/ACCESS.2020.2984745. (Year: 2020).*

Agarwal, S. et al: "Recent Advances in Object Detection in the Age of Deep Convolutional Neural Networks" Arxiv.org Cornell University Library, Sep. 10, 2018, XP081465554.

He, K. et al: "Mask R-CNN" Jan. 24, 2018, Retrived from internet: https://arxiv.org/pdf/1703/06870.pdf DOI: 10/1109/TPAMI.2018.2844175.

Komarichev, A. et al: "A-CNN: Annularly Convolutional Neural Networks on Point Clouds" 2019 IEEE/CVF Conference on Computer Vision and Pattern Recognition, Jun. 15, 2019, pp. 7413-7422, DOI: 10.1109/CVPR.2019.00760.

Li, J. et al: "A Density-Aware PointRCNN for 3D Objection Detection in Point Clouds" Arxiv.org, Cornell University Library, Sep. 11, 2020.

Reza, A. et al"Automatic Dense Annotation for Monucular 3D Scene Understanding" IEEE Access, vol. 08, Apr. 1, 2020, pp. 68852-68865, DOI: 10.1109/ACCESS.2020.2984745.

Shi, S. et al: "PointRCNN: 3D Oject Proposal Generation and Detection from Point Cloud" May 16, 2019, Arxiv.org, arXiv:1812.04244v2 , pp. 1-10.

Tripathy, R. et al. "Gaussian processes with built-in dimensionality reduction: Applications in high-dimensional uncertainty propagation" Arxiv.org, arXiv:1602.04550v1, Feb. 15, 2016.

Li, E. et al: "SUSTech Points: A Portable 3D Point Cloud Interactive Annotation Platform System" IEEE Intelligent Vehicles Symposium, Oct. 19, 2020, pp. 1108-1115, DOI: 10.1109/IV47402.2020.9304562.

Yin, T. et al: "Center-based 3D Object Detection and Tracking" Arxiv.org, arXiv.2006.11275v1, Jun. 19, 2020, pp. 1-11.

International Search Report dated Jun. 30, 2022 in corresponding application PCT/EP2021/081845.

Han Guo et al., "A Scalable Data Augmentation and Training Pipeline for Logo Detection", IEEE International Symposium on Multimedia, 2019, pp. 48-55.

* cited by examiner

1. Annotate    4. Interpolate    2. Extrapolate    4. Interpolate    3. Extrapolate

METHOD AND SYSTEM FOR ANNOTATING SENSOR DATA

This nonprovisional application is a continuation of International Application No PCT/EP2021/081845, which was filed on Nov. 16, 2021, and which claims priority to German Patent Application No 10 2020 130 335.1, which was filed in Germany on Nov. 17, 2020, and which are both herein incorporated by reference.

BACKGROUND OF THE INVENTION

Field of the Invention

The invention relates to a computer-implemented method for automatically annotating driving scenario sensor data, a computer-readable data carrier, and a computer system.

Description of the Background Art

Autonomous driving promises an unprecedented level of comfort and safety in everyday traffic. Despite enormous investments by various companies, however, existing approaches can only be used under limited conditions or provide only a partial amount of truly autonomous behavior. One reason for this is the lack of a sufficient number and variety of driving scenarios. Annotated sensor data from driving scenarios are required for the training of autonomous driving functions. A common approach to data annotation, also called data enrichment, uses a large number of workers to manually annotate each image. As a result, conventional data enrichment methods are extremely time-consuming, error-prone, and therefore extremely expensive.

A semi-automatic approach comprising keyframe annotation and interpolation/extrapolation provides some—limited—improvement. This is shown schematically in FIG. 2 and comprises the selection of a number of images as keyframes, which are manually annotated using propagation/extrapolation. After the manual editing of the keyframes, the annotations to the intervening frames are generated by interpolation. Thus, the recognition of objects on keyframes is performed by humans who continue to link related objects using extrapolation. The interpolation process then uses this information—object recognition and linking—to generate annotations for the same objects on all frames between keyframes. Theoretically, the efficiency of this mechanism can be increased by increasing the distance between keyframes, because more annotations will then be created automatically. However, greater spacing between keyframes is associated with a dramatic increase in the manual corrections required. Objects that can only be seen briefly on non-keyframes, for example, must be covered by manual intervention. This is where this automation approach reaches its limits rather quickly.

Only small- to medium-sized data enrichment projects can therefore be tackled by conventional annotation strategies, whereas other higher-level functions such as validation of autonomous driving functions, selection of data, or the creation of scenario libraries are unattainable due to the enormous manual effort and associated costs.

SUMMARY OF THE INVENTION

It is therefore an object of the present invention to provide improved methods for annotating driving scenario sensor data; an automated annotation method with minimal need for human intervention would be especially desirable.

The object is achieved by a method for annotating driving scenario sensor data, a computer-readable data carrier, and a computer system.

In an exemplary embodiment, a computer-implemented method for annotating driving scenario sensor data is provided, comprising: receiving raw sensor data, wherein the raw sensor data comprise a plurality of successive LIDAR point clouds and/or a plurality of successive camera images, recognizing objects in each image of the camera data and/or each point cloud using one or more neural networks, wherein preferably an object class, an object position, an object size, and/or object extents are assigned to a recognized object, in particular the coordinates of a bounding box surrounding the object, correlating objects within successive images and/or point clouds, removing false positive results on the basis of plausibility criteria, and exporting the annotated sensor data of the driving scenario.

Advantageously, the neural networks for object recognition can be optimized for high recall, therefore, for recognizing as high a percentage as possible of objects that are actually present, because the later removal of false positive results on the basis of plausibility criteria effectively minimizes false recognitions without manual intervention.

The invention is based on the idea that semantic information derived from the temporal correlation of objects in the individual frames of an image can be effectively utilized using a series of steps/techniques. In this case, objects are recognized first that are expediently tracked or correlated with one another over a series of images as well. The employed techniques further comprise removing false positive results in which an object was erroneously recognized, filling of gaps, optimizing object size and position by regression, and smoothing trajectories. Some steps/techniques like a regression of object size and/or position can be optional.

The invention introduces a paradigm shift in which annotation occurs automatically in advance and only guided quality control is required to successfully complete the project. By automatically applying an automatic annotation process to raw data, high quality annotations can be created much faster (better project lead times), at lower cost (less manual effort required), and with consistent quality. In contrast, the annotation according to the state of the art relies on labor from low-wage countries, where large numbers of people with little experience work on creating annotations. This usually leads to significant quality problems and extensive post-processing cycles which slow down the project further and increase costs.

A new level of quality, consistency, and automation is achieved with a method of the invention, which has much higher throughput rates than previous annotation methods. Only quality assurance still has to be covered by human labor, which leads to a considerable reduction in costs.

This makes it possible to carry out projects at scales that could not be realized previously due to the cost of manual annotation, but also to perform higher-level functions such as data selection much more meaningfully, because annotation is now only a matter of computation time and no longer of manual effort. Thus, all raw data can be annotated in advance in order to then select interesting scenes on the basis of the annotations. The manual quality assurance effort can be applied only to interesting data in a subsequent step.

The raw sensor data can comprise LIDAR point clouds, wherein the LIDAR point cloud may be divided into at least two regions, wherein a neural network of a first architecture is used in the first region and a neural network of a second architecture is used in the second region, wherein the first architecture is different from the second architecture. An automatic selection allows an optimal adaptation of the neural network used to the requirements.

The first region can comprise the immediate vicinity of a measuring vehicle that has captured the raw sensor data, whereas the second region has a minimum distance from the measuring vehicle, wherein preferably a center-point-based architecture is used in the first region and a pointRCNN-based architecture is used in the second region for the neural network for object recognition. For more distant objects, which often have only a few measurement points, a neural network with PointRCNN architecture enables the generation of bounding boxes with appropriate dimensions. In the near region, a neural network in the center-point architecture enables better discrimination between different object classes. The manual correction effort is minimized in this way.

The method can additionally comprise removing duplicates before objects are correlated, wherein the removal of duplicates is preferably based on an overlap criterion and/or a confidence level of a neural network. If two bounding boxes have a very large overlap, which can be determined by comparison with a threshold value such as 0.98, they refer to the same object. Additionally, it can also be provided that only objects with a low confidence level are discarded. The confidence level can be determined using a specially trained network or it can be approximated by an information of the network used for object recognition.

The removal of duplicates of recognized objects can be performed within an image and/or a point cloud, wherein it is checked for two overlapping objects, i.e., a first object recognized with a first confidence level and a second object recognized with a second confidence level, wherein the first confidence level is higher than the second confidence level, whether the overlap, in particular the intersection over union, exceeds a predefined threshold value, and wherein in this case the second object is discarded as a duplicate. In principle, there could also be an arbitrary selection of the duplicate to be discarded.

Correlating objects can comprise linking objects in successive frames, therefore, images and/or point clouds, wherein an object in a first frame is correlated with an object in a second frame if the objects belong to the same object class and the overlap, in particular the intersection over union, exceeds a predefined threshold value. Because LIDAR sensors, but especially cameras, take a large number of measurements per second, a vehicle's environment usually changes gradually. By analyzing the temporal correlation between successive frames, further information can be obtained and/or the plausibility of an object recognition can be checked.

Correlating objects can comprise predicting a position of an object on a subsequent image and/or a subsequent point cloud by means of a Gaussian process reduction or a Kalman filter and/or tracking of objects in successive images occurs by means of a factor graph, therefore, a bipartite graph for factoring the probability distribution. The methods mentioned are particularly expedient for determining the correlation.

For example, after the correlating of objects, a correction of missed objects can take place, wherein more than two consecutive frames are analyzed, wherein if an object in a first frame was correlated with an object in a third frame but no object was detected in the intervening frame, the object is then inserted in the second frame. Alternatively or in addition, it can also be provided that a larger number of successive frames are considered, whereby also such gaps can be closed that comprise a number of frames. Missed objects can occur especially due to occlusions or truncation. As an additional criterion, it can be provided that gaps from more than one frame are closed only if another object has been recognized at the relevant position or in a vicinity thereof. In particular, an analysis of the bounding box of the further object could be used to determine whether it is sufficiently large for occlusion.

The plausibility criteria for removing false positive results may be based on the height above the ground, the duration of existence, and/or the confidence level of a neural network. An object can be discarded as implausible if more than a given fraction has been detected below the earth's surface. Furthermore, an object can be discarded as implausible if it was detected above the ground by more than a predefined threshold value. The plausibility criteria and/or threshold values can be selected depending on the object class. Furthermore, an object can be discarded as implausible if it has a very short duration of existence; therefore, in particular, it was detected only in one frame but not in the neighboring frames. A possible occlusion can be expediently taken into account in analyzing the duration of existence. Alternatively or in addition, the discarding of an object as implausible can be made to be contingent on the confidence level of a neural network, wherein, in particular, only objects with a low confidence level can be discarded. The confidence level can be determined using a specially trained network or it can be approximated by an information of the network used for object recognition.

The method can further comprise optimizing the object size and/or object position in each image of the camera data and/or each point cloud by regression. Because object recognition has already taken place, the evaluation can be optimized for a particularly accurate determination of the bounding boxes.

The method can further comprise harmonizing the size of correlated objects in successive images and/or point clouds, wherein preferably the harmonizing of the size of correlated objects is done or omitted depending on the object class. For example, vehicles such as passenger cars or tractor trailers must be of a consistent size. By harmonizing the size, the objects appear more natural.

It is advantageous if the raw sensor data comprise LIDAR point clouds and simultaneously acquired camera data, wherein a correlation of objects is performed taking into account the relative spatial orientation of the LIDAR sensor and the camera. Thus, the spatial information of the LIDAR sensor and the higher resolution of the camera can be used optimally.

At least one neural network can be used for attribute recognition for a recognized object. Preferably, at least one attribute, in particular the turn signal status of a vehicle, is determined on the basis of a camera image and assigned to an object in the LIDAR point cloud. The at least one attribute and the neural network(s) used for recognition can be selected depending on the object class. When both point clouds and camera images are available, sensor fusion can be performed expediently, wherein the camera image is used for attribute recognition and the attribute is assigned to the fused object.

The invention further relates to a computer-readable data carrier containing instructions which, when executed by a processor of a computer system, cause the computer system to execute a method of the invention.

Further, the invention relates to a computer system comprising a processor, a human-machine interface, and a non-volatile memory, wherein the nonvolatile memory contains instructions which, when executed by the processor, cause the computer system to execute a method of the invention.

The processor may be a general-purpose microprocessor commonly used as the central processing unit of a workstation computer, or it can comprise one or more processing elements suitable for performing specific computations, such as, for example, a graphics processing unit. Also, the processor can be replaced or supplemented by a programmable logic device, e.g., a field-programmable gate array, which is configured to perform a specified number of operations, and/or can comprise an IP core microprocessor.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
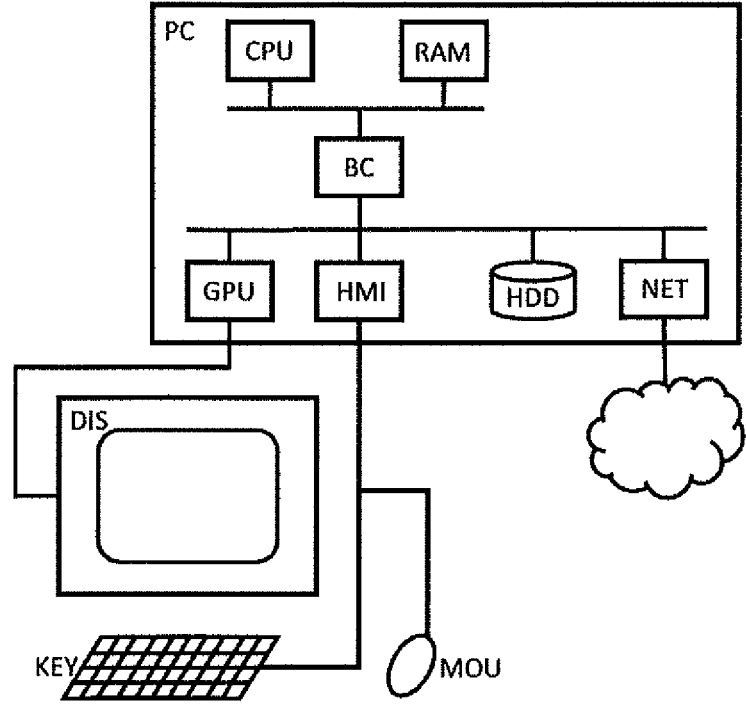
FIG. 1 is an exemplary diagram of a computer system.

FIG. 1 shows an example of a computer system. The example shown comprises a host computer PC having a monitor DIS and input devices such as a keyboard KEY and a mouse MOU.

The host computer PC comprises at least one processor CPU with one or more cores, a random access memory RAM, and a number of devices connected to a local bus (such as PCI Express) which exchanges data with the CPU via a bus controller BC. The devices comprise, e.g., a graphics processor GPU to drive the display, a controller USB to connect peripheral devices, a nonvolatile memory such as a hard disk or a solid-state disk, and a network interface NC. The nonvolatile memory can comprise instructions that, when executed by one or more cores of the processor CPU, cause the computer system to execute a method of the invention.

In an example of the invention, indicated by a stylized cloud in the figure, the host computer can comprise one or more servers comprising one or more computing elements such as processors or FPGAs, wherein the servers are connected via a network to a client comprising a display device and input device. Thus, the method for generating simulation scenarios can be partially or fully executed on a remote server, for example, in a cloud computing setup. As an alternative to a PC client, a graphical user interface of the simulation environment can be displayed on a portable computing device, in particular on a tablet or smartphone.

Figure 2:
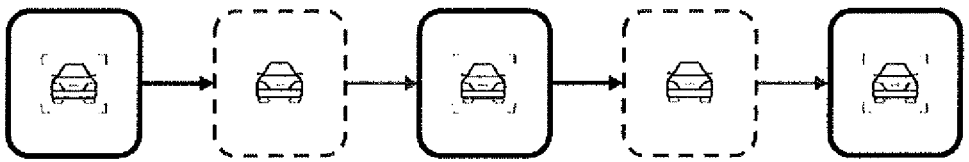
FIG. 2 is a schematic representation of a number of images that are annotated semi-automatically with the aid of keyframes.

FIG. 2 schematically shows a number of successive images that are annotated semi-automatically with the aid of keyframes.

The first, third, and fifth frames are each a keyframe (indicated by a bold border), whereas the second and fourth frames are treated as intervening frames (indicated by a dashed border). In a first step (1. Annotate), the first keyframe is manually provided with the desired annotations, for example, by drawing a bounding box around recognized objects, and by adding further attributes such as, e.g., the object class. In a second step (2. Extrapolate), a predicted position of the objects annotated in the first keyframe is determined for the second keyframe and corrected manually. Likely new added objects are annotated completely manually. In a third step (3. Extrapolate), a predicted position of the already annotated objects for the third keyframe is determined and corrected manually. Once all keyframes are annotated, the object positions on the intervening frames are determined by interpolation in a fourth step (4. Interpolate) and the attributes are transferred.

An increase of the automation rate by increasing the distance between keyframes is limited by the fact that the manual correction effort increases very quickly because the extrapolation and possibly also the interpolation of the object positions are no longer sufficiently accurate.

The introduction of the temporal correlation, in which annotations of the same object are automatically correlated across the time axis, and the combination with object recognition via neural networks can effectively overcome the limitations of the current semi-automation. Temporal correlation is based on the fact that successive images change only gradually over time. Logical links between objects can be automatically detected and used to extract higher level semantic information, enabling an object recognition-based approach which ultimately leads to a much higher level of automation.

Figure 3:
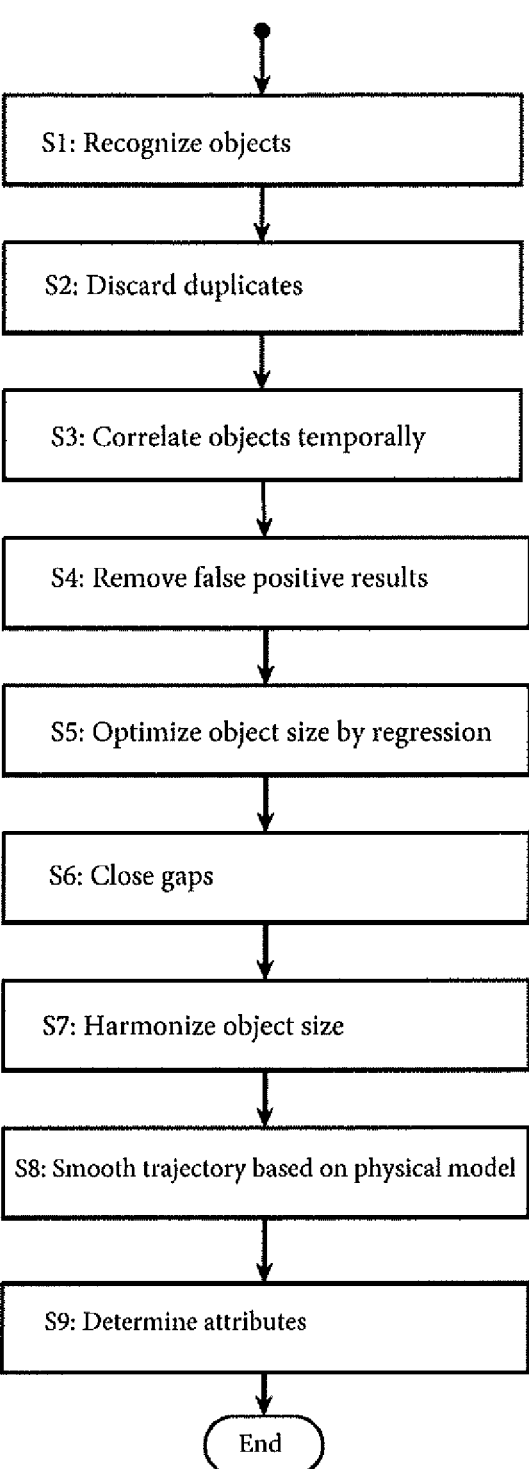
FIG. 3 shows a schematic flowchart of an example of the method of the invention for annotating driving scenario sensor data.

FIG. 3 shows a schematic flowchart of an example of the method of the invention for annotating driving scenario sensor data.

In a first step S1 (recognize objects), neural networks are used for object recognition, preferably to recognize as many objects as possible in each image or each point cloud.

Figure 4:
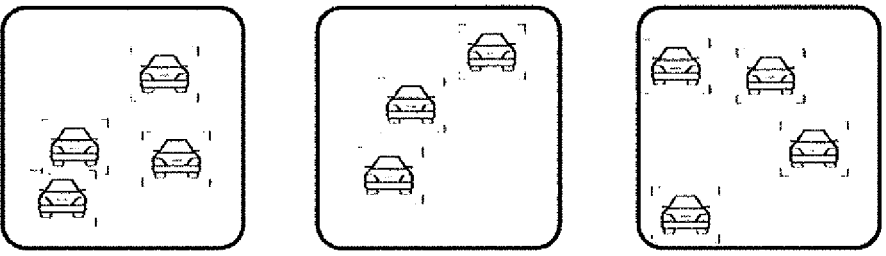
FIG. 4 is a schematic representation of a number of images on which automatic object recognition has been performed.

FIG. 4 schematically represents a series of images in which neural networks have recognized a number of objects in the first pass. For example, as indicated, this can involve motor vehicles; in principle, various object types or classes, in addition to vehicles, pedestrians, animals, and obstacles, or any other static or dynamic object of interest are recognized in each frame of a clip or a successive series of frames and/or LIDAR point clouds.

Different neural network architectures may be used for object recognition depending on the object class and/or range of sensor data. In particular, different neural network architectures in different regions can be used for the recognition of objects in a LIDAR point cloud, wherein the regions are preferably divided into a near region around the measuring vehicle and a far region.

An architecture based on pointRCNN in the far region is preferably used, which is described in "PointRCNN: 3D Object Proposal Generation and Detection from Point Cloud" by Shaoshuai Shi et al., arXiv:1812.04244v2, May 16, 2019. It is expediently particularly good at suggesting reasonable box sizes, and is therefore also suitable for annotating distant objects that may be formed of only a few measuring points.

In the near region, a center-point-based neural network architecture, described in "Center-based 3D Object Detection and Tracking" by Tianwei Yin et al., arXiv: 2006.11275v1, Jun. 19, 2020, is used preferably. It is better suited for discriminating between different object classes, and therefore provides better results in the near region where there are many measuring points.

Different network architectures can be combined for better coverage.

In a second step S2 (discard duplicates), duplicates are removed, in which the used object detectors have thus generated multiple bounding boxes around a single object in the analyzed frame (image or point cloud). These occur because neural networks are usually optimized for the highest possible coverage so as not to miss any objects, but this leads to many duplicates. Removing or discarding duplication can be done based on filtering rules, which may comprise one or more criteria.

A criterion may consider the overlap, in particular the intersection over union, also known as the Jaccard index, between two bounding boxes. If the overlap of two boxes is above a predefined threshold value, in particular 0.98 for intersection over union, they are considered duplicates. The predefined threshold value can also be selected depending on the recognized object class. It can also be provided as a criterion that, in addition to a given overlap, an identical object class must be present for two boxes to be considered duplicates. Further, the confidence of the network used for object recognition can be used as a criterion for a filter rule and/or considered in a combined criterion with the object class. In addition, it can be provided in the case of detected duplicates to select the box to be deleted on the basis of the assigned confidence, in particular to delete the box with the lower confidence.

Figure 5:
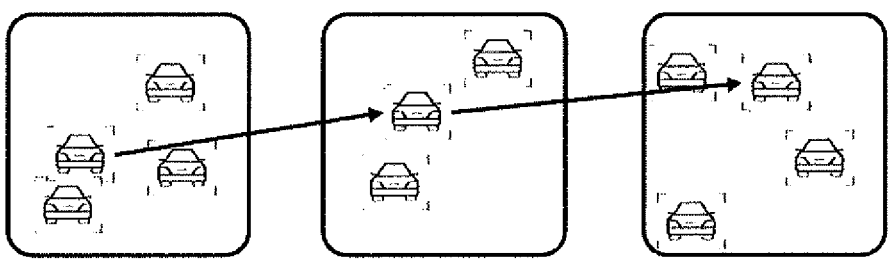
FIG. 5 is a schematic representation of a number of images for which a temporal correlation was determined.

In a third step S3 (correlate objects temporally), the remaining objects are analyzed along their time axis to determine temporal correlations. This is schematically indicated in FIG. 5, which shows 3 successive frames in which a vehicle is marked as identical across the frames by arrows. By identifying objects that correlate with each other, they can be linked to form chains, which then later enable a more extensive evaluation but also the closing of recognition gaps in an intervening frame.

Correlation of objects can be done as a linking in a unidirectional or bidirectional way. First pass detection gaps can be bridged based on this linking to overcome occlusions, truncations, and missed objects.

Unidirectional linking can be performed by estimating the position of an object in a subsequent image. If during object recognition an object was detected within the estimated region which satisfies certain plausibility checks (class type, Ackermann model for vehicle motion, . . . ), these two object instances are marked as belonging to the same object.

A Gaussian process reduction or a Kalman filter can be used as a strategy to estimate the position. The Gaussian process reduction is described in "Gaussian processes with built-in dimensionality reduction: Applications in high-dimensional uncertainty propagation," by Rohit Tripathy et al., arXiv:1602.04550v1, Feb. 15, 2016. Kalman filters are used in statistics and control theory and are also known as linear quadratic estimation. The algorithm of a Kalman filter uses a series of measurements, observed over time and containing statistical noise and other inaccuracies, to produce estimates for unknown variables that are generally more accurate than estimates based on a single measurement. Furthermore, particle filters or sequential Monte Carlo methods (SMC) can be used for position estimation, therefore a set of Monte Carlo algorithms which are used to solve filtering problems in signal processing and Bayesian statistical inference. The longer the chain of already linked objects, the more information can be used for highly precise position estimation.

A factor graph (a bipartite graph representing the factorization of a function) can be used alternatively for object tracking. Here, each object on one image is linked to each object on a subsequent image. Each link is weighted according to certain criteria and then the perfect link is derived over both frames and over all objects. Weighting rules can be formulated using heuristics or behavioral models.

Once a correlation of objects in successive frames has occurred, based on this linking, additional semantic information such as trajectories (therefore, the path traveled by a mass point in motion through space as a function of time), velocity (as a function over time), location, occlusion (object temporally occluded by other objects), and truncation (at the edges of the areas detected by the sensors), as well as information about detection failures (object exists on the previous and subsequent frames, so that recognition may have failed in between), can be derived and used as input for subsequent automation steps.

In a fourth step S4 (remove false positive results), erroneously recognized objects are removed. A variety of rules or criteria can be used and/or combined for the removal of false positive objects.

For example, the height above the ground can be considered, wherein objects detected as being partially below the ground surface and/or objects that appear to hover above the ground are discarded as implausible. Alternatively or in addition, the motion or trajectory can be considered for vehicles, wherein one or more quantities such as acceleration or change in direction can be determined and compared with predefined limit values; an acceleration outside the range typical for a particular type of vehicle or outside physical possibilities limited by the grip limits of the tires to the ground is implausible. Also, the time span of existence can be considered, wherein an object that exists only within a single frame or for a few fractions of a second, but does not appear in the neighboring frames, is implausible. Expediently, the possible occlusion by other objects is also taken into account here in order to avoid errors in the determination of this time span of existence. In addition, it can also be provided that only those objects are discarded as implausible that were recognized only with a low confidence by the neural network.

The detection of false positive results is strongly related to the semantic information derived from the temporal correlation. In the real world, for example, an object would not exist for only a fraction of a second. By discarding implausible objects, the contractually agreed upon precision and recognition values can be achieved in an annotation project.

In a fifth step S5 (optimize object sizes by regression), each object is regressed to its perfect position and size via a neural network. In an example of the invention, adjacent images can also be considered in the regression of box sizes. Alternatively or in addition, it can also be provided, as in step S7 below, to match the sizes of the boxes of an identified or correlated object in a further post-processing step.

Figure 6:
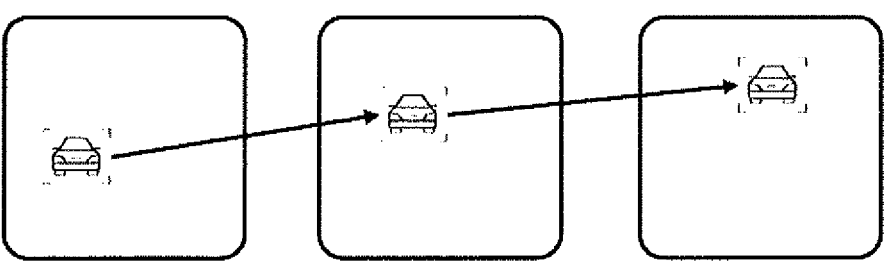
FIG. 6 is a schematic representation of a number of successive images with a trajectory on which a more extensive evaluation can be performed.

In a sixth step S6 (close gaps), based on the temporal context, gaps are closed by interpolation. Additional semantic information can be derived from the correlation of objects in successive frames, in order to obtain continuous trajectories for road users even in the case of occlusion, wherein an object located in the foreground temporarily occludes another, and/or in the case of clipping, wherein the object protrudes from the areas detected by the sensors, or in the case of a recognition error where the object exists on the previous and subsequent images, for which reason the recognition in between has failed. Further semantic information can also be derived from the temporal correlation and used as input for subsequent automation or post-processing steps. FIG. 6 schematically represents a series of frames in which a correlated object has been selected for further evaluation.

In a seventh step S7 (harmonize size), sizes are harmonized across chains of successive images and/or LIDAR point clouds. This is especially important to achieve realistic sizes so that the object looks better and feels more natural to the human viewer. The harmonization of the size of correlated objects in successive images and/or point clouds is preferably done or omitted depending on the object class. In particular, harmonization of the size can take place for vehicles, because cars typically maintain their size across frames. Because pedestrians can have a different presumed size depending on their current posture, it is advantageous to refrain from harmonizing the size for the pedestrian object class.

In an eighth step S8 (smooth trajectory based on physical model), the trajectories of dynamic objects or road users in the scene are smoothed according to their underlying physical models. For example, the common single-track model can be used to describe the driving behavior of a motor vehicle.

A recognition of attributes is performed in a ninth step S9 (determine attributes). This can comprise various additional steps.

The relevant attributes can vary depending on the label specification valid for the current project, wherein different object classes often have different attributes. For example, motor vehicles have turn signals to indicate a planned change in direction and brake lights to indicate a brake actuation. In the ninth pass or step, attribute recognition for projects can preferably occur based on sensor fusion. If required, values are set for turn signals, brake lights, emergency lights, or other descriptive properties of an annotation. In order to be able to correlate object instances in 2D camera images with object instances of the same object in 3D LiDAR scans, common information must be identified in both datasets. These common data points are then used to merge the two datasets. For attribute recognition, various 2D-based object recognition networks can be run on the merged datasets; in particular, an attribute can be determined on a camera image and assigned to an object in the LIDAR point cloud.

The annotated sensor data can be used for various purposes, such as, for example, the extraction of driving scenarios (scenario extraction), or training of perception networks, for which annotated or enriched data are required as ground truth (data enrichment). Depending on the automation goal, in this case, both the sequence and the individual configuration of the steps explained above can be adjusted, so that some of the steps mentioned above can be optional, therefore, executed or omitted, and additional steps can also be added to further enrich the data as required.

For example, the following steps can be performed for scenario extraction:
1. Recognition of objects (step S1)
2. Tracking on the basis of temporal correlations (step S3)
3. Recognition/elimination of false positive results (step S4)
4. Regression (step S5)
5. Size harmonization (step S7)
6. Smoothing of trajectories (step S8)

For example, the following steps could be performed for the selection of data:
1. Recognition of objects
2. Tracking on the basis of temporal correlations
3. False positive recognition/elimination For example, the following steps can be performed alternatively for data enrichment:
1. Recognition of objects (step S1)
2. Tracking on the basis of temporal correlations (step S3)
3. Recognition/elimination of false positive results (step S4)
4. Regression of position and size (cf. step S5)
5. Size harmonization (step S7)
6. Regression of position only (cf. step S5)
7. Recognition of attributes such as turn signals, brake lights, and other descriptive properties (step S9)

Preferably, the algorithms for performing the various steps are structured to satisfy a common interface or API in order to be interchangeable with each other and in the sequence, so that they can be combined in different ways to achieve different target results.

Figure 7:
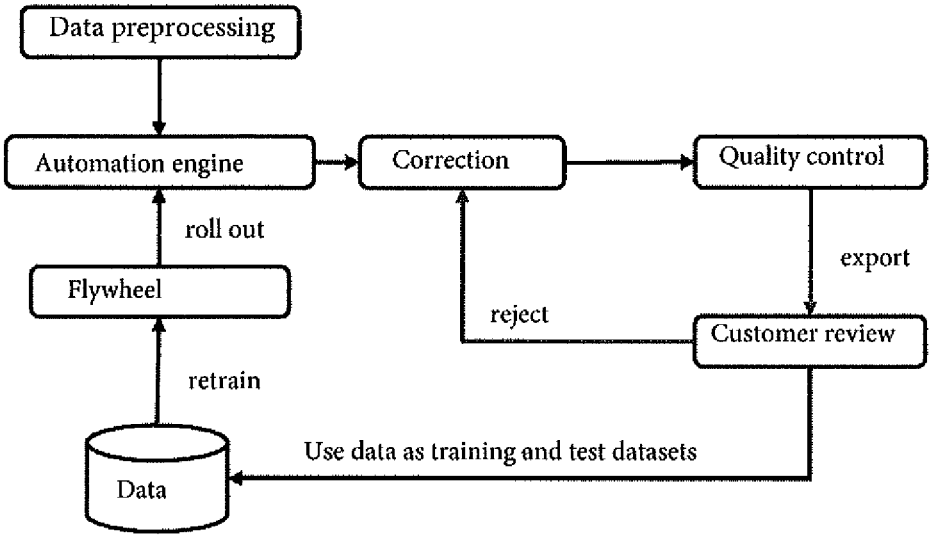
FIG. 7 shows an automation system for carrying out a method of the invention.

FIG. 7 shows an example of an automation system for carrying out a method of the invention. The automation system implements various supplementary steps in dedicated components and is well suited for execution in a cloud computing environment.

In a first step, data preprocessing, raw sensor data are received, which may be unsorted, for example. Raw sensor data can comprise data from environmental sensors such as LIDAR point clouds and/or images from one or more cameras, as well as data from a GPS receiver and/or one or more vehicle sensors such as wheel speed, acceleration, or yaw rate sensors. The data can be normalized, e.g., split into individual frames and/or combined into larger packets in order to enable uniform processing. A combining of simultaneously captured data from the various sensors can also take place.

In a second step, the automation engine, a packet of frames is processed by at least one automation component. Automation components are a central part of the workflow of an annotation system. In particular, the automation components may be neural networks or other machine learning-based technologies that learn from datasets in a supervised, semi-supervised, or unsupervised manner. Automation components can implement individual steps or substeps of a method of the invention. In some steps, such as, for example, attribute recognition (S9), multiple automation components can be used, such as different neural networks to recognize one attribute in each case.

Figure 9:
FIG. 9 shows an example of a user interface for quality control.

In a third step, quality control, preferably a sample of frames is selected and checked by a human. Here, the human quality inspector can be shown, for example, a camera image and/or a LIDAR point cloud with the corresponding annotations, such as, for example, a bounding box, and asked whether the bounding box is correct. Alternatively, he can be shown a user interface to adjust the bounding box and/or to add a bounding box if an object has been missed by the neural network. The automation system receives the inputs from the quality inspector. A possible example of a user interface is shown in FIG. 9.

If the quality check was successful, the annotated data can be exported. In a fourth step, customer review, the customer can review a sample of the exported frames to ensure that the annotations meet his specifications and desired annotation quality. If the customer rejects the annotations, the package of annotated data is manually revised in the correction step.

In a fifth step, the correction, a manual annotation of the rejected package takes place. After a new quality control and successful customer review, the annotated frames can be used as training/validation or test datasets. These datasets are symbolically represented by a cylinder and can be used for new or additional training.

In a sixth step, the "flywheel," one or more neural networks or automation components are retrained based on the training datasets. After successful testing with the corresponding test dataset, the improved neural networks can be output or used in the automation engine.

Figure 8:
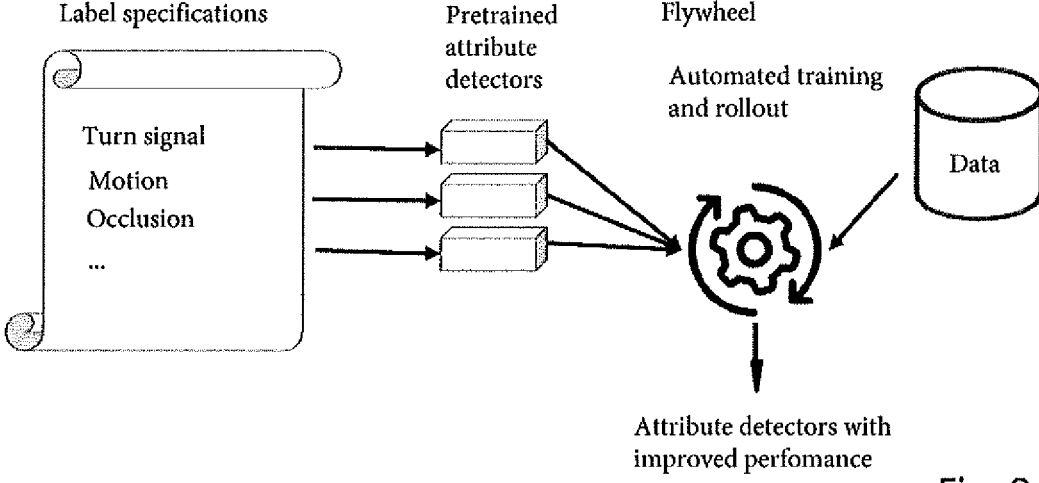
FIG. 8 shows a method for the automated training of attribute detectors.

FIG. 8 shows an example of a "flywheel" method for the automated training of attribute detectors.

Flywheel comprises techniques for efficiently storing training sets for each automation component, monitoring changes in training sets, and automatically triggering retraining as soon as predefined or automatically determined threshold values for changes in training sets are detected. In addition, flywheel comprises techniques to automatically roll out newly trained models into automation components.

Which attributes have to be recognized is stipulated in the label specifications of the particular annotation project. For an object of the class passenger car, by way of example, the status of the turn signals, a state of motion, and a possible occlusion are named as attributes. Basically, objects can have a variety of attributes to be specified for the particular object class.

Preferably, a neural network pretrained on the basis of an existing dataset is used as an attribute detector for each of the attributes. With the presence of verified new datasets, at least one attribute detector is retrained so that the attribute detectors show an improved performance over the course of the annotation project and the manual effort decreases.

FIG. 9 shows an example of a user interface for quality control.

An excerpt of a LIDAR point cloud is shown on the left in which a bounding box is shown with its forward direction and an indication of the ground plane (as a circle). In the center, an excerpt of a simultaneously acquired camera image is shown, in which the bounding box is also drawn. A selection list is shown on the right, in which various attributes of the object surrounded by the bounding box can be selected or entered. For example, this is a vehicle that is stationary (static) and has no turn signal set (left/right turn signal off). It can also be provided that the user interface comprises a button that opens another window for indicating quality issues. For example, the dimension of the bounding box is not correct here because one corner of the vehicle is outside the box. Such an interface simplifies quality control and reduces the time required for it.

A method of the invention uses the temporal correlation between successive frames to determine plausible object recognitions and consistent sizes and thus enables annotation of large amounts of data.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for annotating driving scenario sensor data, wherein the method comprises:
   receiving raw sensor data, wherein the raw sensor data comprises a plurality of successive point clouds from a LIDAR sensor and/or a plurality of successive images from one or more cameras;
   recognizing objects in each image and/or each point cloud using one or more neural networks;
   correlating objects within successive images and/or point clouds;
   removing false positive results on a basis of plausibility criteria; and
   exporting annotated sensor data of a driving scenario,
   wherein the plausibility criteria for removing false positive results are based on a height above the ground, a duration of existence, and/or a confidence level of a neural network,
   wherein the raw sensor data comprises LIDAR point clouds and simultaneously acquired camera data,
   wherein said correlating objects is performed taking into account a relative spatial orientation of a LIDAR sensor and a camera, and
   wherein at least one neural network for attribute recognition is applied to a detected object and at least one attribute of the object is determined using a camera image and assigned to the object in the LIDAR point cloud.

2. The method according to claim 1, wherein the raw sensor data comprise point clouds from the LIDAR sensor, wherein a point cloud is divided into at least two regions, wherein a neural network of a first architecture is used to recognize objects in the first region and a neural network of a second architecture is used in the second region, and wherein the first architecture is different from the second architecture.

3. The method according to claim 2, wherein the first region comprises the immediate vicinity of a measuring vehicle, whereas the second region has a minimum distance from the measuring vehicle, wherein a center-point-based architecture is used in the first region and a point RCNN-based architecture is used in the second region for the neural network for object recognition.

4. The method according to claim 1, further comprising:
   removing duplicates before objects are correlated,
   wherein said removing the duplicates is based on an overlap criterion and/or a confidence level of a neural network.

5. The method according to claim 4, wherein said removing the duplicates of recognized objects is performed within an image and/or point cloud,
   wherein the objects are checked for two overlapping objects or a first object recognized with a first confidence level and a second object recognized with a second confidence level,
   wherein the first confidence level is higher than the second confidence level, wherein it is determined whether the overlap or an intersection over union exceeds a predefined threshold value, and wherein in case of the overlap, the second object is discarded as a duplicate.

6. The method according to claim 1, wherein said correlating objects comprises linking objects in successive frames, therefore, images and/or point clouds, and wherein an object in a first frame is correlated with an object in a second frame if the objects belong to the same object class and the overlap or an intersection over union exceeds a predefined threshold value.

7. The method according to claim 6, further comprising correcting missed objects, wherein more than two consecutive frames are analyzed, wherein if an object in a first frame was correlated with an object in a third frame but no object was detected in an intervening frame, the object is then inserted in the second frame.

8. The method according to claim 1, wherein correlating objects comprises predicting a position of an object on a subsequent image and/or a subsequent point cloud by means of a Gaussian process reduction or a Kalman filter and/or tracking of objects in successive images occurs by means of a factor graph, therefore, a bipartite graph for factoring the probability distribution.

9. The method according to claim 1, further comprising optimizing an object size and/or an object position in each image of the raw sensor data and/or each point cloud by regression.

10. A non-transitory, computer-readable data storage medium containing instructions which, when executed by a processor of a computer system, cause the computer system to execute the method according to claim 1.

11. A computer system comprising a processor, a human-machine interface, and a nonvolatile memory, wherein the nonvolatile memory contains instructions which, when executed by the processor, cause the computer system to execute the method according to claim 1.

12. A computer-implemented method for annotating driving scenario sensor data, wherein the method comprises:

receiving raw sensor data, wherein the raw sensor data comprises a plurality of successive point clouds from a LIDAR sensor and/or a plurality of successive images from one or more cameras;

recognizing objects in each image and/or each point cloud using one or more neural networks;

correlating objects within successive images and/or point clouds;

removing false positive results on a basis of plausibility criteria; and exporting annotated sensor data of a driving scenario, wherein the raw sensor data comprises point clouds from a LIDAR sensor, wherein a point cloud is divided into at least two regions, wherein a neural network of a first architecture is used to recognize objects in a first region and a neural network of a second architecture is used in a second region, wherein the first architecture is different from the second architecture, and wherein the first region comprises an immediate vicinity of a measuring vehicle, whereas the second region has a minimum distance from the measuring vehicle, and wherein a center-point-based architecture is used in the first region and a point RCNN-based architecture is used in the second region for the neural network for object recognition.

13. A computer-implemented method for annotating driving scenario sensor data, wherein the method comprises:

receiving raw sensor data, wherein the raw sensor data comprises a plurality of successive point clouds from a LIDAR sensor and/or a plurality of successive images from one or more cameras;

recognizing objects in each image and/or each point cloud using one or more neural networks;

correlating objects within successive images and/or point clouds;

removing false positive results on a basis of plausibility criteria; and exporting annotated sensor data of a driving scenario, wherein the raw sensor data comprise point clouds from a LIDAR sensor, wherein a point cloud is divided into at least two regions, wherein a neural network of a first architecture is used to recognize objects in a first region and a neural network of a second architecture is used in a second region, wherein the first architecture is different from the second architecture, and wherein said correlating objects comprises predicting a position of an object on a subsequent image and/or a subsequent point cloud by means of a Gaussian process reduction or a Kalman filter and/or tracking of objects in successive images occurs by means of a factor graph, therefore, a bipartite graph for factoring a probability distribution.

* * * * *